United States Patent
Cui et al.

(10) Patent No.: US 10,983,379 B2
(45) Date of Patent: Apr. 20, 2021

(54) DISPLAY DEVICE

(71) Applicant: HISENSE VISUAL TECHNOLOGY CO., LTD., Shandong (CN)

(72) Inventors: Liming Cui, Shandong (CN); Lei Shi, Shandong (CN); Yu Chen, Shandong (CN); Ji Ma, Shandong (CN); Zhiqiang Tang, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/705,010

(22) Filed: Dec. 5, 2019

(65) Prior Publication Data

US 2020/0341324 A1   Oct. 29, 2020

Related U.S. Application Data

(63) Continuation of application No. PCT/CN2019/118275, filed on Nov. 14, 2019.

(30) Foreign Application Priority Data

Apr. 29, 2019  (CN) .......................... 201910357524.9

(51) Int. Cl.
*G02F 1/1333* (2006.01)
*F21V 8/00* (2006.01)

(52) U.S. Cl.
CPC ..... *G02F 1/133308* (2013.01); *G02B 6/0055* (2013.01); *G02B 6/0085* (2013.01); *G02F 2001/133314* (2013.01); *G02F 2001/133317* (2013.01); *G02F 2001/133328* (2013.01)

(58) Field of Classification Search
None
See application file for complete search history.

(56) References Cited

U.S. PATENT DOCUMENTS

| | | | |
|---|---|---|---|
| 2013/0044449 A1 | 2/2013 | Chiu et al. | |
| 2013/0242540 A1* | 9/2013 | Kuo | G02F 1/133608 362/97.1 |
| 2016/0353592 A1* | 12/2016 | Li | H05K 5/0017 |
| 2018/0335667 A1* | 11/2018 | Wang | G02B 6/006 |

FOREIGN PATENT DOCUMENTS

| | | |
|---|---|---|
| CN | 102955522 A | 3/2013 |
| CN | 204287672 U | 4/2015 |
| CN | 204481949 U | 7/2015 |
| CN | 105227876 A | 1/2016 |
| CN | 207764512 U | 8/2018 |
| CN | 110099235 A | 8/2019 |
| KR | 20030094702 | 12/2003 |
| KR | 20090074666 A | 7/2009 |

OTHER PUBLICATIONS

ISA State Intellectual Property Office of the People's Republic of China, International Search Report Issued in Application No. PCT/CN2019/118275, dated Feb. 18, 2020, WIPO, 4 pages.
State Intellectual Property Office of the People's Republic of China, Office Action and Search Report Issued in Application No. 2019103575249, dated Jul. 1, 2020, 11 pages, (Submitted with Machine Translation).

* cited by examiner

*Primary Examiner* — Ashok Patel
(74) *Attorney, Agent, or Firm* — Hauptman Ham, LLP (57) ABSTRACT

A display device includes a display panel, an optical component, a first back panel, and a second back panel. The first back panel and the second back panel are fixedly connected via a plurality of adapter brackets.

19 Claims, 8 Drawing Sheets

DISPLAY DEVICE

CROSS REFERENCE TO RELATED APPLICATIONS

This application is a continuation application of International Application No. PCT/CN2019/118275 filed on Nov. 14, 2019, which claims priority to Chinese patent application No. 2019103575249 filed on Apr. 29, 2019, the entire content of which is incorporated herein by reference.

TECHNICAL FIELD

The present application relates to display technology, and in particular, to a display device.

BACKGROUND

Liquid Crystal Display Televisions (LCD TVs) generally include a backlight module and a display panel. According to different light incidence manners in the backlight module, the backlight module may be divided into a direct-type backlight module and an edge lit type backlight module. Currently, ultra-thin, ultra-narrow, bezel-free and so on are leading the trends of the LCD TVs. How to assemble various components of the LCD TVs is a problem to be solved.

SUMMARY

The present application provides a display device.

Embodiments of the present application relate to a display device, including a display panel, an optical component, a first back panel (may also be referred to as backplane), and a second back panel, where the display panel, optical component, first back panel and second back panel are arranged in sequence along a thickness direction of the display device, and a plurality of adapter brackets fixedly connecting the first back panel and the second back panel (may also be referred to as adapter support).

According to the above contents, the display device includes the first back panel and the second back panel, and the first back panel and the second back panel are fixedly connected together via the adapter brackets, so that the fixed connection between the two back panels in the display device is achieved.

BRIEF DESCRIPTION OF THE DRAWINGS

In order to explain the embodiments of the present application more clearly, the drawings used in the description of the embodiments will be briefly described below. It is obvious that the drawings in the following descriptions are only some embodiments of the present application. Those skilled in the art may also obtain other drawings based on these drawings without involving inventive work.

DETAILED DESCRIPTION

Embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing example embodiments only and is not intended to be limiting. As used herein, the singular forms "a," "an" and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

Figure 1:
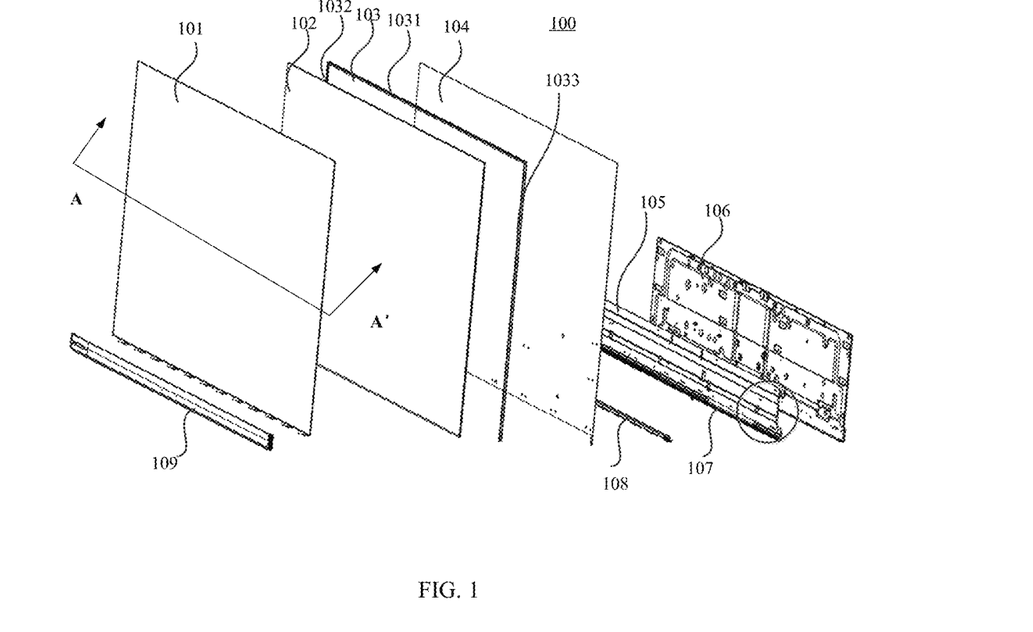
FIG. 1 is an exploded view of a display device 100 according to at least one embodiment of the present application.
Figure 2:
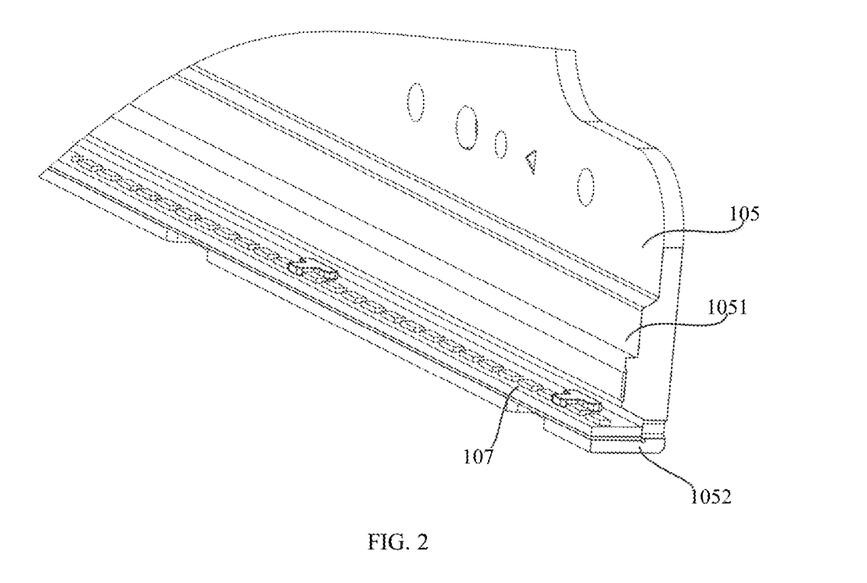
FIG. 2 is an enlarged view of a circle portion in FIG. 1.
Figures 3, 4:
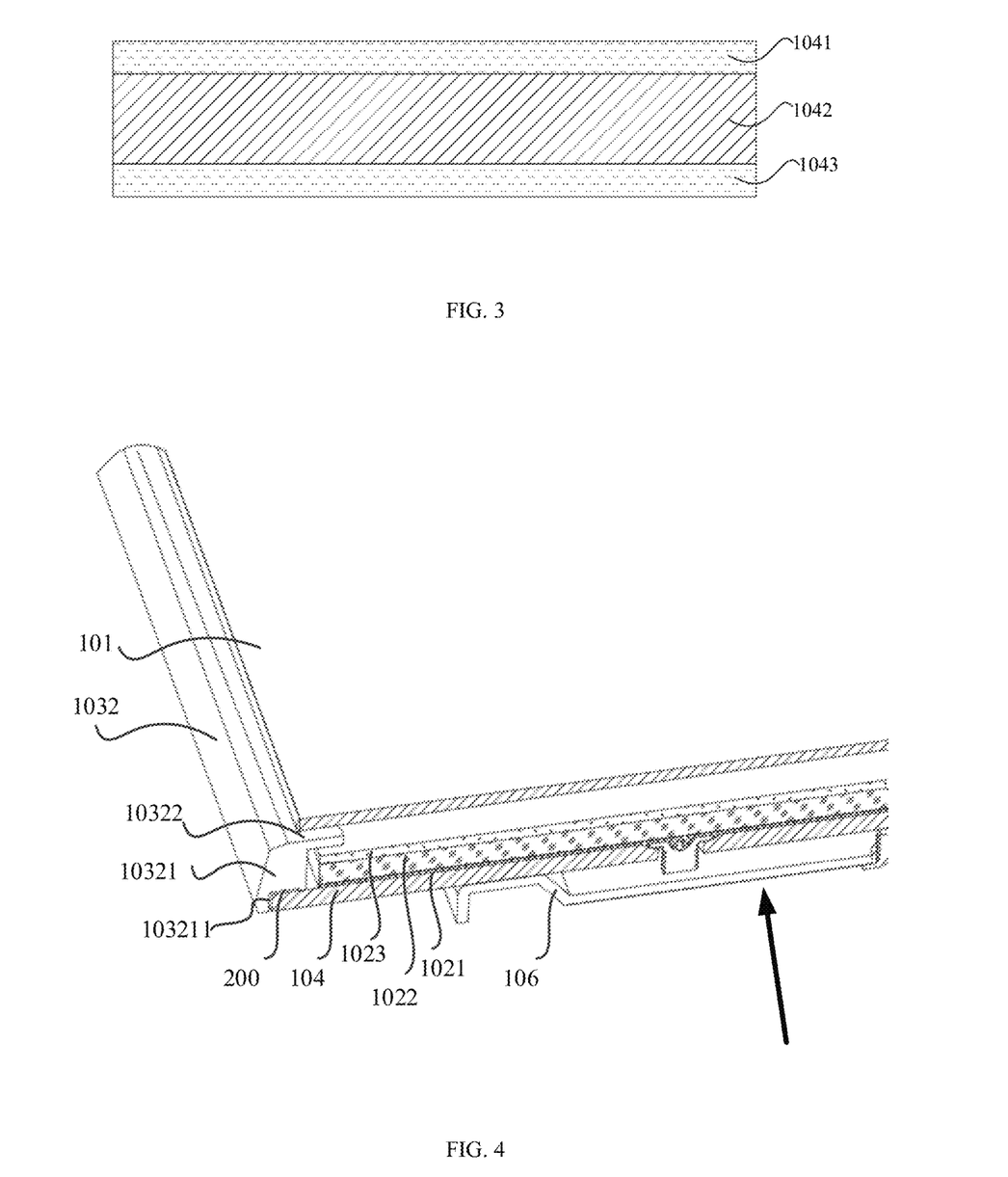
FIG. 3 is a cross-sectional view of a first back panel 104 along a thickness direction.
FIG. 4 is a cross-sectional view of the display device 100 along line A-A' shown in FIG. 1.
Figure 5:
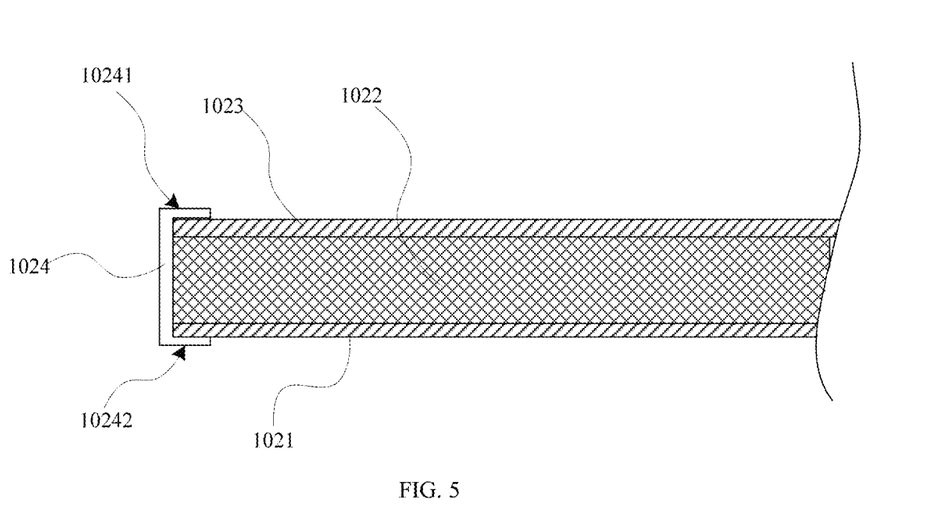
FIG. 5 is a cross-sectional view of an optical component 102 along a thickness direction of the display device at an adhesive tape.
Figure 6:
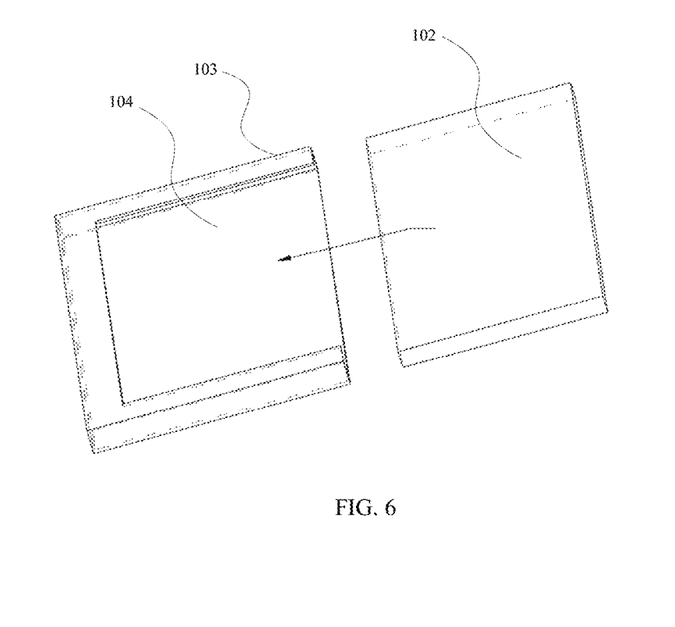
FIG. 6 is a simplified assembly view of the optical component 102.

FIG. 1 is an exploded view of a display device 100 according to at least one embodiment of the present application. FIG. 2 is an enlarged view of a circle portion in FIG. 1. FIG. 3 is a cross-sectional view of a first back panel 104 along a thickness direction. FIG. 4 is a cross-sectional view of the display device 100 along line A-A' shown in FIG. 1. FIG. 5 is a cross-sectional view of an optical component 102 along a thickness direction of the display device at an adhesive tape. FIG. 6 is a simplified assembly view of the optical component 102.

As shown in FIGS. 1 and 2, the display device 100 includes a display panel 101, an optical component 102, a middle frame 103, a first back panel 104, a heat-radiating component 105, and a second back panel 106 assembled in sequence along a thickness direction of the display device 100. The display device 100 further includes a light source 107, a front frame 108, and a front shell 109.

Compared with other components of the display device 100, the second back panel 106 is located farthest from the display panel 101, and an area of the second back panel 106 is smaller than an area of the first back panel 104. In some embodiments, the area of the second back panel 106 may be ½ to ⅕ of the area of the first back panel 104. In an embodiment of the present application, the second back panel 106 is made from a steel plate or an aluminum plate, with a plurality of convex hulls stamped thereon. The convex hulls are used for mounting and fixing power supply boards, speakers, and other components and parts (not shown).

The heat-radiating component 105 includes a main body 1051, and a bent part 1052 connected with the main body 1051 and forming an angle with the main body 1051. In at least one embodiment of the present application, the bent part 1052 and the main body 1051 forms a 90° angle. The heat-radiating component 105 is made from an L-shaped aluminum material. The light source 107 is a single light bar fixed on the bent part 1052. Light emitting from the light source 107 enters into the optical component 102 from a side thereof. The display device 100 is an edge lit type display device.

Further, as shown in FIGS. 1 and 2, the main body 1051 of the heat-radiating component 105 is located between the first back panel 104 and the second back panel 106. An area of the main body 1051 is smaller than an area of the second back panel 106 and an area of the first back panel 104 respectively. That is, the heat-radiating component 105 only partially covers the first back panel 104 and the second back panel 106, and is used to dissipate heat from the light source 107.

The first back panel 104 has a flat plate shape in general. In at least one embodiment of the present application, the first back panel 104 is a composite panel. The first back panel 104 includes a first layer 1041, a third layer 1043, and a second layer 1042 between the first layer 1041 and the third layer 1043 along a thickness direction of the first back panel 104, as shown in FIG. 3. The first layer 1041 and the third layer 1043 are made of the same material, and a steel plate or an aluminum plate may be used. The second layer 1042 is a polyethylene (PE) layer. Since the first back panel 104 is composited by three layers of materials, its strength is higher than that of a single-layer steel plate or a single-layer aluminum plate. Thus, the thickness of the first back panel 104 is relatively smaller in the case where the same strength requirement for the back panel is satisfied.

The middle frame 103 includes a first middle frame 1031, a second middle frame 1032 connected with one end of the first middle frame 1031, and a third middle frame 1033 connected with the other end of the first middle frame 1032. The second middle frame 1032 and the third middle frame 1033 are disposed in opposite direction. The first middle frame 1031, the second middle frame 1032, and the third middle frame 1033 form a quadrangle with one side open. The first middle frame 1031, the second middle frame 1032, and the third middle frame 1033 may form a quadrangle with one side open in a splicing manner or integrally. The structure of the first middle frame 1031, the second middle frame 1032, and the third middle frame 1033 are similar except for a slight difference in structures at two ends. The structure of the second middle frame 1032 will be described below as an example.

As shown in FIG. 4, the second middle frame 1032 has an elongated shape in general, and includes a side wall part 10321 and a supporting part 10322 connected with the side wall part 10321. A plane in which the side wall part 10321 is located is almost vertical to a plane in which the supporting part 10322 is located. The supporting part 10322 is used to support the display panel 101. A notch part 103211 is formed at one end of the side wall part 10321 away from the display panel 101, and an end of the first back panel 104 is located in the notch part 103211. The end of the side wall part 10321 away from the display panel 101 is flush with a side of the first back panel 104 away from the display panel 101. The side wall part 10321 and the first back panel 104 are adhered by an adhesive tape 200. As such, an accommodation space is formed between the supporting part 10322 and the first back panel 104 for placing the optical component 102. In at least one embodiment of the present application, the supporting part 10322 does not include a stop portion for limiting the movement of the display panel 101 along a plane in which the display panel 101 is located.

When the display panel 101 is placed on the supporting part 10322, the display panel 101 is in a floating state in general.

The structures of the first middle frame 1031, the second middle frame 1032, and the third middle frame 1033 are similar except for a slight difference at two ends. Thus, after the first middle frame 1031, the second middle frame 1032, and the third middle frame 1033 are respectively fixed on the first back panel 104 by adhering, a drawer shape enclosed by the three middle frames may be formed, as shown in FIG. 6.

As shown in FIGS. 4 and 5, the optical component 102 includes a reflecting plate 1021 which is adjacent to the first back panel 104, a light guide plate 1022, and an optical film 1023 in sequence along the thickness direction of the display device 100. The optical component 102 further includes an adhesive tape 1024 for fixing the reflecting plate 1021, the light guide plate 1022, and the optical film 1023 together. In at least one embodiment of the present application, the light guide plate 1022 is a glass light guide plate. The glass light guide plate has a thickness of 1.6 mm. Compared with the light guide plate made of polymethyl methacrylate (PMMA), the glass light guide plate has stronger rigidity, which is advantageous for improving the strength of the entire display device 100.

Edges of the reflecting plate 1021 and the optical film 1023 in embodiments of the present application do not include a lug structure for hooking fixation. A first end 10241 of the adhesive tape 1024 is adhered to the optical film 1023, and a second end 10242 of the adhesive tape 1024 is adhered to the reflecting plate 1021. The adhesive tape 1024 may be located on one side or both sides of the light guide plate 1022 in a longitudinal direction, or on one side or both sides of the light guide plate 1022 in a width direction. The adhesive tape 1024 may be adhered to one side or both sides of the light guide plate 1022 in sections or in entire section. Thereby, the reflecting plate 1021, the light guide plate 1022, and the optical film 1023 are integrated by adhesion to form a single unit.

In the display device 100 according to embodiments of the present application, the reflecting plate 1021, the light guide plate 1022, and the optical film 1023 are fixed together by the adhesive tape 1024, without additional fixing structure disposed on the middle frame, which may adapt to a narrow Black Margin (BM) region and realize a narrow bezel of the display device 100.

The assembly process of the display device 100 in the embodiments of the present application will be briefly described below with reference to FIGS. 1-2 and FIGS. 4-6.

First, the middle frame 103 is adhered to one edge of the first back panel 104. The drawer shape enclosed by three faces as shown in FIG. 6 is formed between the supporting part of the middle frame 103 and the first back panel 104. The reflecting plate 1021, the light guide plate 1022, and the optical film 1023 are fixed together by the adhesive tape 1024 to form an integrated optical component 102.

Next, the optical component 102 is pushed into the drawer formed by the middle frame 103 and the first back panel 104 along a direction indicated by an arrow in FIG. 6 so as to achieve the installation of the optical component 102.

Then, the heat-radiating component 105 fixed with the light bars 107 as the light source, the front frame 108, and the front shell 109 are sequentially mounted on the open side of the drawer surrounded by the middle frame 103 and the first back panel 104, and finally, the second back panel 106 is mounted on an outermost side of the drawer away from the display panel 101.

When the display device 100 is assembled in the above manner, since the second back panel 106 is subsequently mounted on the first back panel 104, as shown in FIG. 4, screws need to be locked from outside to inside in a direction indicated by an arrow in FIG. 4 to achieve a fixed connection between the first back panel 104 and the second back panel 106. At this time, it is required to perform tapping on the first back panel 104. Since the first back panel 104 includes three layers: the PE layer sandwiched by the steel plates or aluminum plates, it is impossible to tap on the first back panel 104. To this end, adapter brackets for fixedly connecting the first back panel 104 and the second back panel 106 is further provided in embodiments of the present application.

Figure 7:
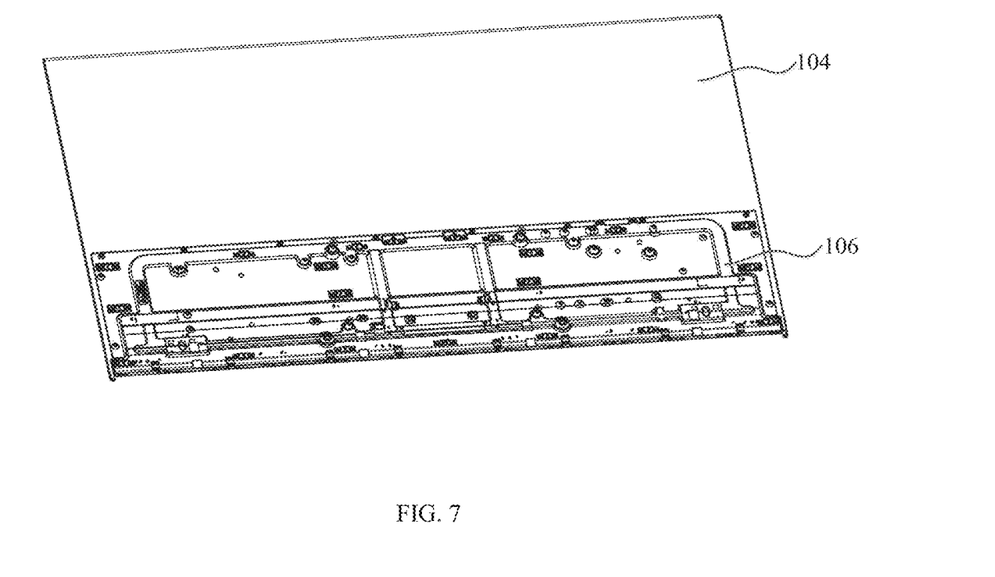
FIG. 7 is a rear view of the display device 100.
Figure 8:
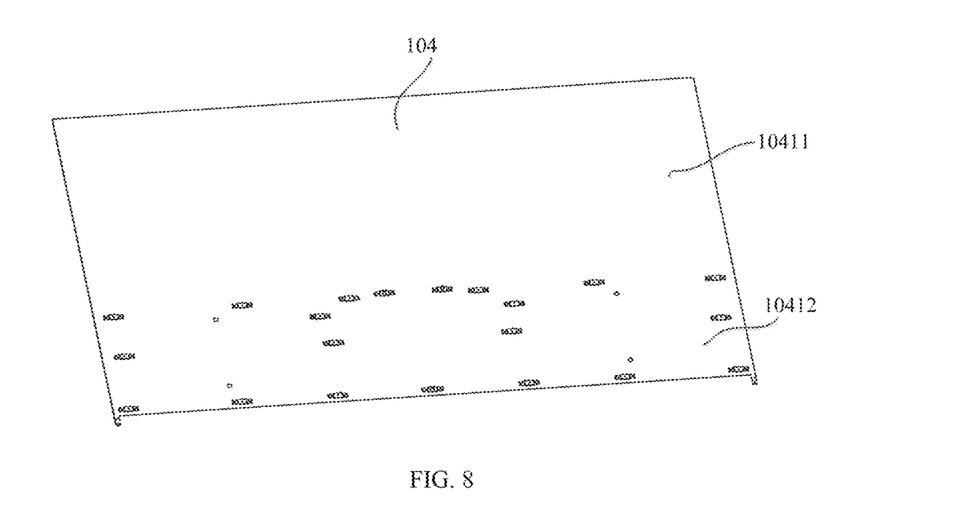
FIG. 8 is a rear view of the first back panel 104 after a second back panel 106 is removed from the display device 100.
Figure 9:
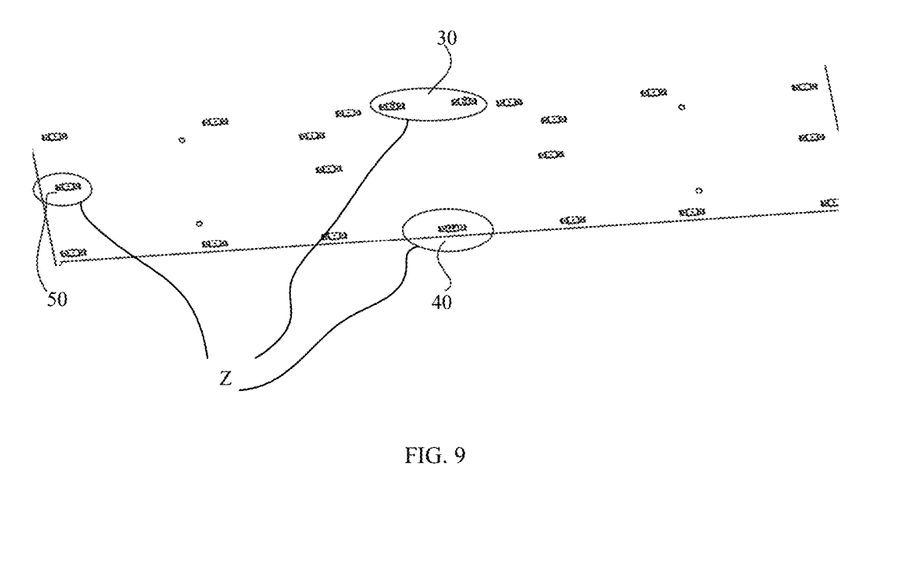
FIG. 9 is a rear view of adapter brackets locations on the first back panel 104 after the second back panel 106 is removed from the display device 100.
Figure 19:
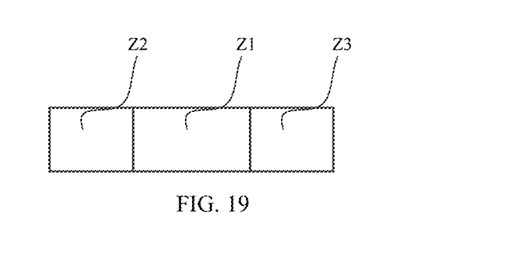
FIG. 19 is a schematic structural view of an adapter bracket Z.

FIG. 7 is a rear view of the display device 100. FIG. 8 is a rear view of the first back panel 104 after the second back panel 106 is removed from the display device 100. FIG. 9 is a rear view of adapter brackets locations on the first back panel 104 after the second back panel 106 is removed from the display device 100. FIG. 19 is a schematic structural view of an adapter bracket Z.

As shown in FIGS. 7-9, the second back panel 106 is mounted on a side of the first back panel 104 away from the display panel 101. The first back panel 104 includes an exposing part 10411 and a mounting part 10412. The mounting part 10412 may be mounted with adapter brackets Z for securing the first back panel 104 and the second back panel 106 together fixedly.

In one or more embodiments of the present application, as shown in FIG. 19, the adapter bracket Z includes a functional part Z1 and fixed connection parts Z2, Z3 which are connected with the functional part Z1. The functional part is a part of a mechanical structure. Depending on the difference of the functional part Z1, the adapter brackets Z include one or more of a positioning bracket 30, a fixation and positioning bracket 40, and a fixation bracket 50. In some embodiments, the adapter brackets Z include one or more positioning brackets 30 and one or more fixation and positioning brackets 40. In other embodiments, the adapter brackets Z include one or more positioning brackets 30 and one or more fixation brackets 50. In some other embodiments, the adapter brackets Z include one or more positioning brackets 30, one or more fixation and positioning brackets 40, and one or more fixation brackets 50.

The display device 100 includes at least one of the positioning bracket 30, the fixation and positioning bracket 40, or the fixation bracket 50. In one or more embodiments of the present application, the display device 100 includes two positioning brackets 30, one fixation and positioning bracket 40, and a plurality of fixation brackets 50.

The positioning brackets 30 and the fixation and positioning brackets 40 are located at a middle portion of the mounting part 10412. The fixation and positioning bracket 40 is adjacent to an edge of the first back panel 140. The positioning brackets 30 are located on an edge of the mounting part 10412 opposite to the fixation and positioning bracket 40. The fixation brackets 50 are located at edges of the mounting part 10412 and a connection portion between the middle portion and the edges.

It is to be noted that the fixed connection parts in the positioning bracket 30, the fixation and positioning bracket 40 and the fixation bracket 50 have similar structure. Here, the positioning bracket 30 is taken as at least one embodiment for detailed description. The structurally similar portions will be omitted with respect to the fixation and positioning bracket 40 and the fixation bracket 50.

A first positioning portion, a first fixation and positioning portion, and a first fixation portion are functional parts Z1, and a second positioning portion and a third positioning portion are fixed connection parts Z2 or Z3 in the following descriptions.

Figure 10:
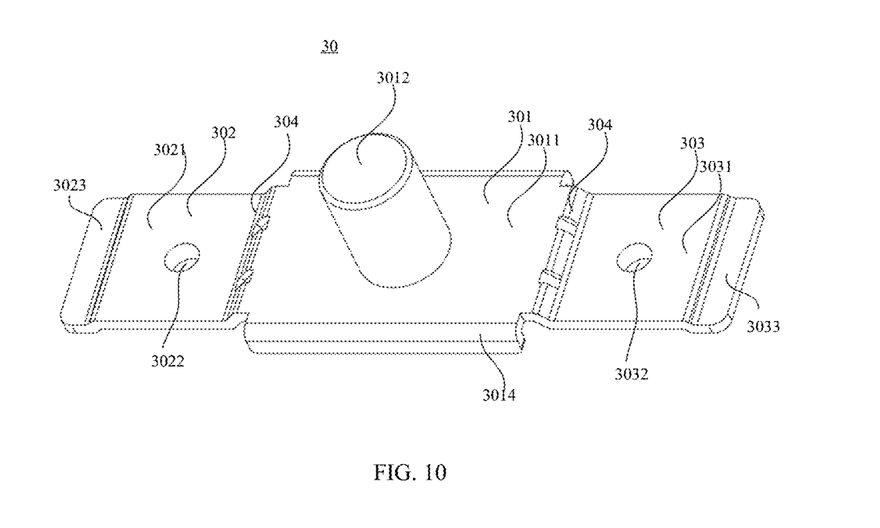
FIG. 10 is a perspective structural view of a positioning bracket 30.
Figure 11:
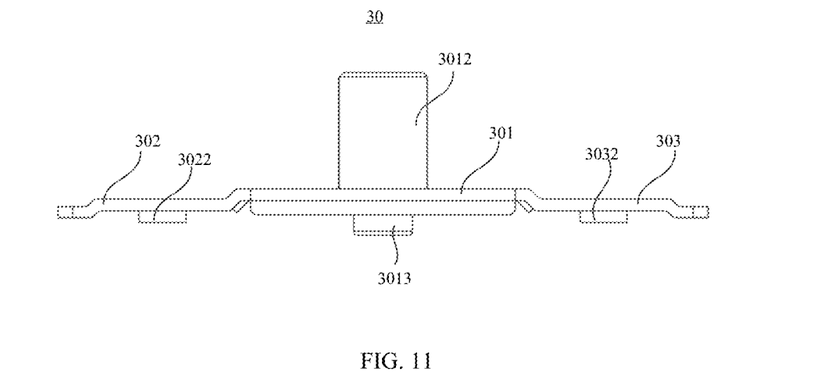
FIG. 11 is a cross-sectional view of the positioning bracket 30.
Figure 12:
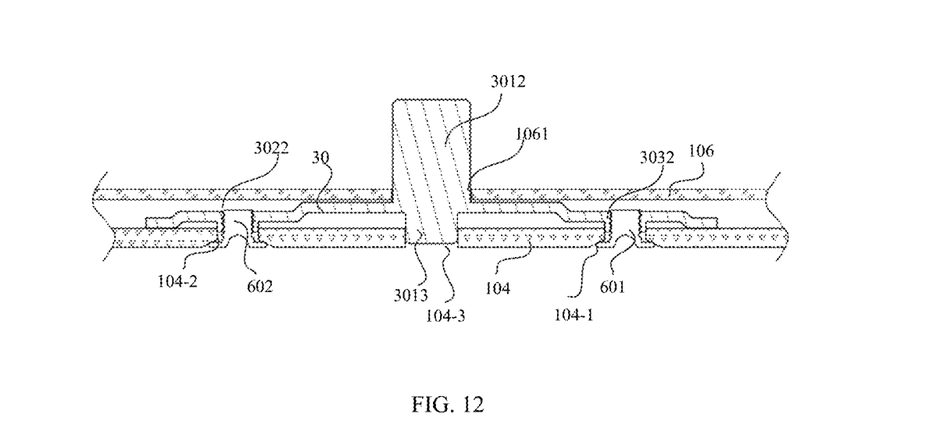
FIG. 12 is a cross-sectional view of the positioning bracket 30 after being assembled with the first back panel 104 and the second back panel 106.
Figure 13:
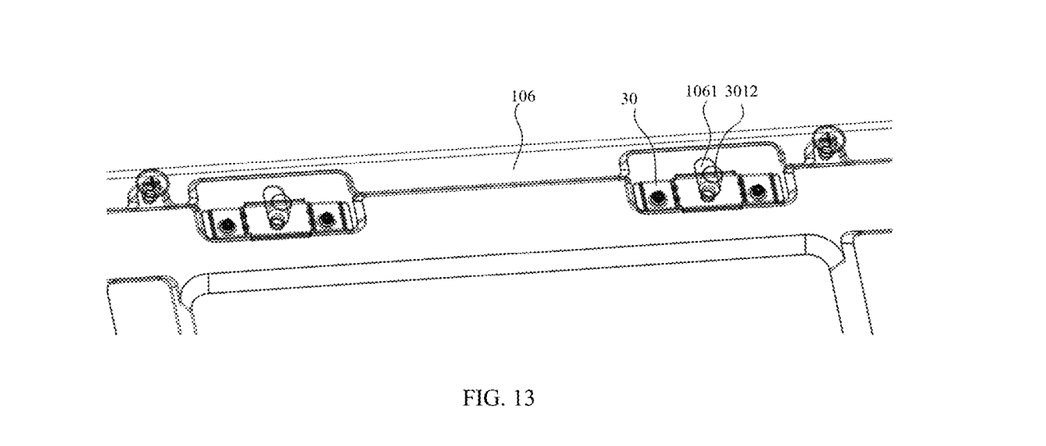
FIG. 13 is an enlarged view of the positioning bracket 30 after being assembled with the first back panel 104 and the second back panel 106.

FIG. 10 is a perspective structural view of the positioning bracket 30. FIG. 11 is a cross-sectional view of the positioning bracket 30. FIG. 12 is a cross-sectional view of the positioning bracket 30 after being assembled with the first back panel 104 and the second back panel 106. FIG. 13 is an enlarged view of the positioning bracket 30 after being assembled with the first back panel 104 and the second back panel 106.

As shown in FIGS. 10-13, the positioning bracket 30 has a sheet-like structure in general, and includes a first positioning portion 301, a second positioning portion 302, a third positioning portion 303, and connection portions 304. The connection portions 304 are respectively connected between the first positioning portion 301 and the second positioning portion 302, and between the first positioning portion 301 and the third positioning portion 303. The second positioning portion 302 and the third positioning portion 303 are symmetrically disposed relative to the first positioning portion 301.

The first positioning portion 301 includes a first positioning body 3011; a first positioning pillar 3012 and a second positioning pillar 3013 respectively extending toward two sides and perpendicular to a plane in which the first positioning body 3011 is located; and rolled edges 3014 on free edges of the first positioning body 3011. The first positioning pillar 3012 is longer than the second positioning pillar 3013.

The first positioning portion 301 is not coplanar with the second positioning portion 302 and the third positioning portion 303. The connection portions 304 have a bent structure.

The second positioning portion 302 includes a second positioning body 3021, a first threaded hole 3022 formed in the second positioning body 3021, and a first bent portion 3023 connected with the second positioning body 3201. Similarly, the third positioning portion 303 also includes a third positioning body 3031, a second threaded hole 3032, and a second bent portion 3033 connected with the third positioning body 3031.

The rolled edges 3014, the connection portions 304, the first bent portion 3023, and the second bent portion 3033 may enhance the strength of the positioning bracket 30.

As shown in FIG. 12, the positioning bracket 30 is mounted between the first back panel 104 and the second back panel 106. The first positioning pillar 3012 of the positioning bracket 30 corresponds to a first positioning hole 1061 opened on the second back panel 106. The first positioning pillar 3012 passes through the first positioning hole 1061 to fix the second back panel 106 and the positioning bracket 30. The second positioning pillar 3013 corresponds to a second positioning hole 104-3, the first threaded hole 3022 corresponds to a third positioning hole 104-2, and the second threaded hole 3032 corresponds to a fourth positioning hole 104-1 opened on the first back panel 104. The second positioning pillar 3013 is inserted into the second positioning hole 104-3. A free end of the second positioning pillar 3013 does not protrude from the first back panel 104. A first screw 601 passes through the fourth positioning hole 104-1 into the second threaded hole 3032, and a second screw 602 passes through the third positioning hole 104-2 into the first threaded hole 3022 respectively to fix the first back panel 104 and the positioning bracket 30. In some embodiments, the positioning bracket 30 may not include the second positioning pillar 3013. That is, the fixation between the first back panel 104 and the positioning bracket 30 may be achieved by screwing the first screw 601 into the second threaded hole 3032 and screwing the second screw 602 into the first threaded hole 3022.

The second positioning pillar 3013 fixes the positioning bracket 30 on the first back panel 104, and the first positioning pillar 3012 realizes the positioning of the second back panel 106. As shown in FIG. 13, the first positioning hole 1061 may be a track hole to achieve coarse positioning of the second back panel 106.

Figure 14:
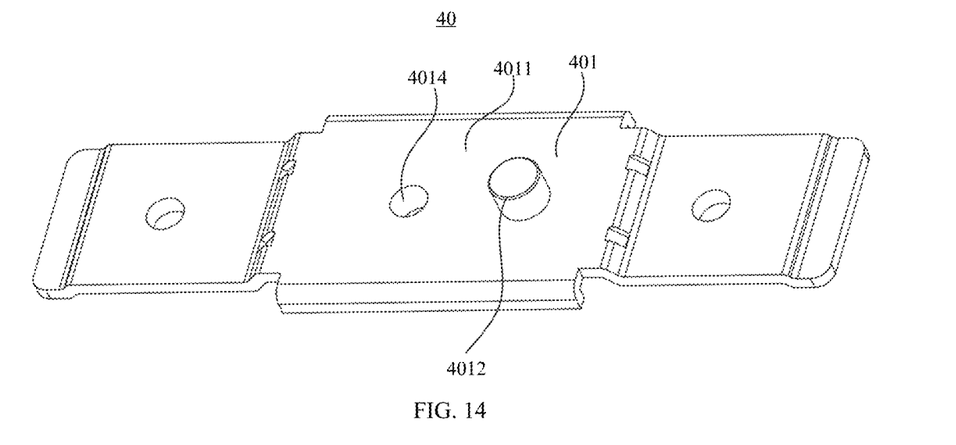
FIG. 14 is a perspective structural view of a fixation and positioning bracket 40.
Figure 15:
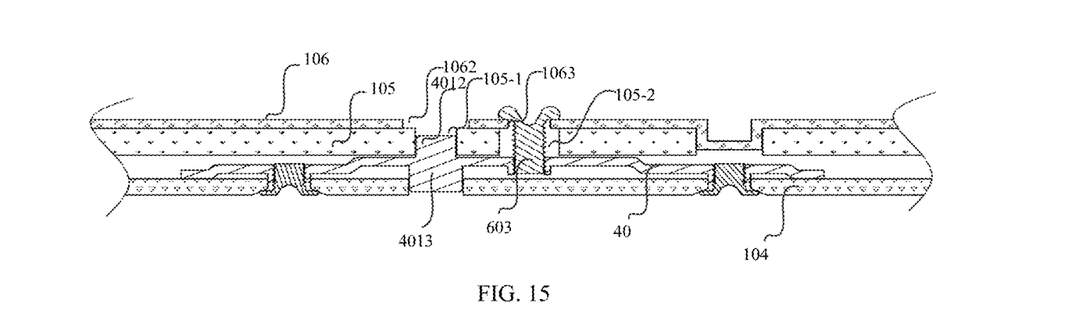
FIG. 15 is a cross-sectional view of the fixation and positioning bracket 40 after being assembled with the first back panel 104, a heat-radiating component 105, and the second back panel 106.
Figure 16:
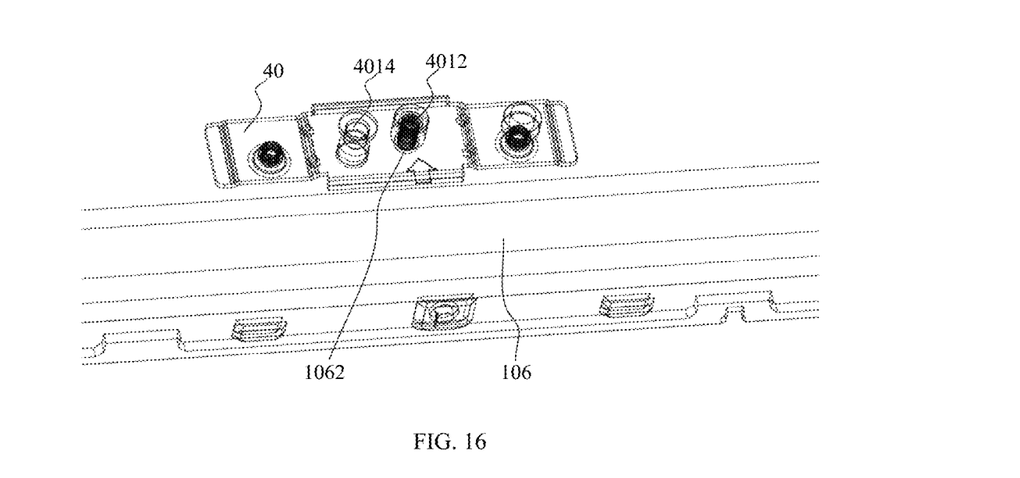
FIG. 16 is an enlarged view of the fixation and positioning bracket 40 after being assembled with the first back panel 104, the heat-radiating component 105, and the second back panel 106.

FIG. 14 is a perspective structural view of the fixation and positioning bracket 40. FIG. 15 is a cross-sectional view of the fixation and positioning bracket 40 after being assembled with the first back panel 104, the heat-radiating component 105, and the second back panel 106. FIG. 16 is an enlarged view of the fixation and positioning bracket 40 after being assembled with the first back panel 104, the heat-radiating component 105, and the second back panel 106.

Similar to the structure of the positioning bracket 30, the fixation and positioning bracket 40 also includes three portions. Because the structure of the fixed connection parts of the fixation and positioning bracket 40 is similar to the structure of the fixed connection parts of the positioning bracket 30, only a middle portion of the fixation and positioning bracket, i.e., a first fixation and positioning portion 401 is described.

The first fixation and positioning portion 401 includes a first fixation and positioning body 4011; a third positioning pillar 4012 and a fourth positioning pillar 4013 respectively extending toward two sides and perpendicular to a plane in which the first fixation and positioning body 4011 is located; and a first fixation hole 4014 formed on the first fixation and positioning portion 4011.

As shown in FIG. 15, the fixation and positioning bracket 40 is disposed between the first back panel 104 and the heat-radiating component 105. The second back panel 106 is located on a side of the heat-radiating component 105 away from the first back panel 104. Different from the positioning bracket 30, since the heat-radiating component 105 is disposed at a position where the fixation and positioning bracket 40 is disposed, a second positioning hole 1062 corresponding to the third positioning pillar 4012 is opened on the second back panel 106, a first through hole 105-1 is opened on the heat-radiating component 105. Meanwhile, a third positioning hole 1063 is opened on the second back panel 106 corresponding to the first fixation hole 4014, and a second through hole 105-2 is opened on the heat-radiating component 105 corresponding to the first fixation hole 4014. A third screw 603 is inserted from the third positioning hole 1063 into the first fixation hole 4014 to fix the second back panel 106, the heat-radiating component 105 and the fixation and positioning bracket 40 together and thereby fixing the first back panel 104 and the second back panel 106. In some embodiments, the fixation and positioning bracket 40 may not include the fourth positioning pillar 4013, and the fixation between the first back panel 104 and the fixation and positioning bracket 40 may be achieved only by screwing the screws into the threaded holes on the fixed connection parts of the fixation and positioning bracket 40.

As shown in FIG. 16, the second positioning hole 1062 on the second back panel 106 is a circular hole, and ensures accurate positioning during assembly.

Figure 17:
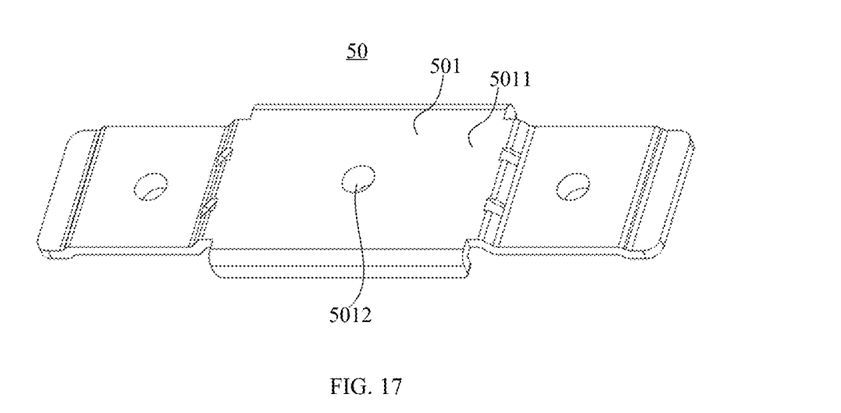
FIG. 17 is a perspective structural view of a fixation bracket 50.
Figure 18:
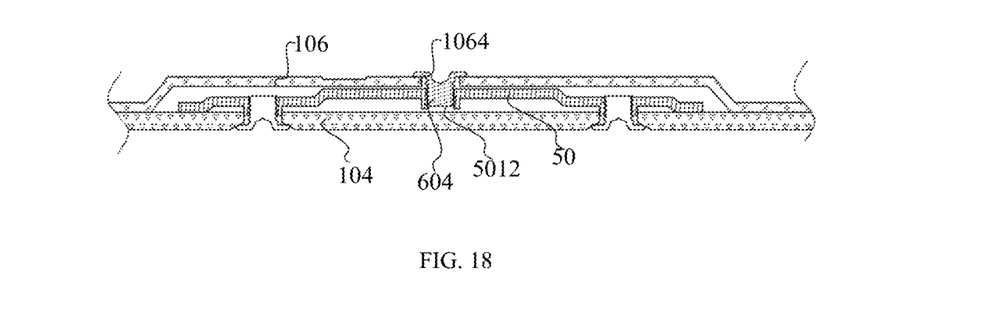
FIG. 18 is a cross-sectional view of the fixation bracket 50 after being assembled with the first back panel 104 and the second back panel 106.

FIG. 17 is a perspective structural view of a fixation bracket 50. FIG. 18 is a cross-sectional view of the fixation bracket 50 after being assembled with the first back panel 104 and the second back panel 106.

Similar to the structure of the positioning bracket 30, the fixation bracket 50 also includes three portions. Since the structure of the fixed connection parts of the fixation bracket 50 is similar to the structure of the fixed connection parts of the positioning bracket 30, only a middle portion of the fixation bracket 50, i.e., a first fixation portion 501, is described. The similar portions will be omitted.

The first fixation portion 501 includes a first fixation body 5011 and a second fixation hole 5012 formed on the first fixation body 5011.

As shown in FIG. 18, a fourth positioning hole 1064 is opened in the second back panel 106 corresponding to the second fixation hole 5012. A fourth screw 604 is inserted from the fourth positioning hole 1064 into the second fixation hole 5012 to fix the second back panel 106 and the fixation bracket 50 together and thereby fixing the second back panel 106 and the first back panel 104.

It is to be noted that the drawings are schematic views showing the fixation bracket 50 at a position where the heat-radiating component 105 is not provided. For the fixation bracket 50 at a position where the heat-radiating component 105 is provided, when the fixation bracket 50 is used to fix the first back panel 104 and the second back panel 106, similarly, corresponding to the second fixation hole 5012, a through hole is opened in the heat-radiating component 105 for the fourth screw 604 to pass through.

The assembly process of the display device 100 including the adapter bracket Z is as follows: as shown in FIGS. 8-9, 12-13, 15-16, and 18, with the threaded holes of the fixed connection parts at two ends of the positioning bracket 30, the fixation and positioning bracket 40, and the fixation bracket 50, the positioning bracket 30, the fixation and positioning bracket 40 and the fixation bracket 50 are locked on the first back panel 104 by screws to form the structure as shown in FIGS. 8-9. The middle frame 103 is bonded to the edges of the first back panel 104 by adhesion, where a three-side drawer shape is formed between the supporting part of the middle frame 103 and the first back panel 104 as shown in FIG. 6. The reflecting plate 1021, the light guide plate 1022, and the optical film 1023 are coupled together by the adhesive tape 1024 to form an integrated optical component 102; then, the optical component 102 is pushed into the drawer formed by the middle frame 103 and the first back panel 104 along the direction indicated by the arrow in FIG. 6, thereby mounting the optical component 102. The heat-radiating component 105 fixed with the light bars 107, the front frame 108 and the front shell 109 are sequentially mounted on an open side of the drawer; then the assembled module is reversed to be as shown in FIG. 13. Mount the second back panel 106 to the assembled module so that the first positioning pillar 3012 of the positioning bracket 30 passes through the first positioning hole 1061 of the second back panel 106 to achieve the coarse positioning of the second back panel 106. Place the second back panel 106 horizontally and push the second back panel 106 upwards until the third positioning pillar 4012 on the fixation and positioning bracket 40 is engaged in the second positioning hole 1062 to precisely position the second back panel 106. Finally, the first back panel 104 and the second back panel 106 are fixed together by screwing the screws into the fixation holes on the fixed bracket 50 and the fixation and positioning bracket 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display device, comprising:
   a display panel;
   an optical component;
   a first back panel;
   a second back panel, wherein the display panel, the optical component, the first back panel and the second back panel are arranged in sequence along a thickness direction of the display device; and
   a plurality of adapter brackets fixedly connecting the first back panel and the second back panel,
   wherein the adapter brackets comprise at least one of a positioning bracket, a fixation and positioning bracket, and a fixation bracket.

2. The display device according to claim 1, wherein an area of the second back panel is smaller than an area of the first back panel.

3. The display device according to claim 2, wherein the first back panel comprises
   a first layer,
   a second layer, and
   a third layer, wherein the second layer is between the first layer and the third layer,
   the first layer and the third layer comprise a steel plate or an aluminum plate, and
   the second layer is a polyethylene (PE) layer.

4. The display device according to claim 1, wherein the first back panel is a composite panel.

5. The display device according to claim 1, wherein at least one of the adapter brackets comprises:
   a functional part, and
   a plurality of fixed connection parts connected with the functional part, each of the plurality of the fixed connection parts includes a threaded hole.

6. The display device according to claim 5, wherein the functional part comprises:
   a first positioning body, and
   a first positioning pillar extending perpendicular to a plane in which the first positioning body is located.

7. The display device according to claim 6, wherein the second back panel includes a track hole corresponding to the first positioning pillar.

8. The display device according to claim 5, wherein the functional part comprises:
   a first positioning body, and
   a first positioning pillar and a second positioning pillar perpendicular to a plane in which the first positioning body is located, wherein the first positioning pillar and the second positioning pillar extend in opposite directions to each other.

9. The display device according to claim 5, wherein the functional part comprises:
   a first fixation and positioning body including a first fixation hole, and
   a third positioning pillar extending perpendicular to a plane where the first fixation and positioning body are located.

10. The display device according to claim 9, wherein the second back panel includes a circular hole corresponding to the third positioning pillar.

11. The display device according to claim 9, wherein at least one of the adapter brackets is fixed to the second back panel via the first fixation hole.

12. The display device according to claim 5, wherein the functional part comprises:
- a first fixation and positioning body including a first fixation hole, and
- a third positioning pillar and a fourth positioning pillar perpendicular to a plane where the first fixation and positioning body is located, wherein the third positioning pillar and the fourth positioning pillar extend in opposite directions to each other.

13. The display device according to claim 5, wherein the functional part comprises
- a first fixation portion comprising
  - a first fixation body including a second fixation hole.

14. The display device according to claim 13, wherein at least one of the adapter brackets is fixed to the second back panel via the second fixation hole.

15. The display device according to claim 5, wherein at least one of the adapter brackets is fixed to the first back panel via the threaded hole.

16. The display device according to claim 1, wherein the optical component comprises
- a reflecting plate,
- a glass light guide plate, and
- an optical film,
wherein the reflecting plate, the glass light guide plate, and the optical film are adhered together.

17. The display device according to claim 1, further comprising
- a middle frame fixed to an edge of the first back panel by adhesion,
wherein the middle frame is a quadrangle with one side open, and the optical component is in a drawer defined by the middle frame and the first back panel.

18. The display device according to claim 17, further comprising:
- a light source at an open side of the drawer; and
- a heat-radiating component at the open side of the drawer for dissipating heat from the light source.

19. A display device, comprising:
- a display panel;
- an optical component;
- a first back panel, wherein the optical component is between the display panel and the first back panel;
- a second back panel, wherein the first back panel is between the display panel and the second back panel; and
- a plurality of adapter brackets fixedly connecting the first back panel and the second back panel, wherein the plurality of adapter brackets comprises:
  - a positioning bracket,
  - a fixation and positioning bracket, wherein the fixation and positioning bracket is spaced from the positioning bracket, and
  - a fixation bracket, wherein the fixation bracket is spaced from each of the positioning bracket and the fixation and positioning bracket.

* * * * *